Patented Oct. 12, 1943

2,331,610

UNITED STATES PATENT OFFICE 2,331,610

ADHESIVE SHEET MATERIAL

Milton H. Kemp, Oak Park, Ill., assignor to The Kendall Company, Boston, Mass., a corporation of Massachusetts No Drawing. Application September 16, 1940, Serial No. 356,981

11 Claims. (Cl. 117—60)

This invention relates in general to adhesive sheet materials and more particularly to transparent pressure-sensitive adhesive tapes, though the invention is equally applicable to the fabrication of non-transparent adhesive tapes.

In the preparation of transparent adhesive tapes the necessity of utilizing a highly transparent backing material has led to the use of non-fibrous cellulosic film backings, such as regenerated cellulose and cellulose acetate. Such backing materials, however, have smooth glossy surfaces and, so far as I am aware, their use has heretofore necessitated the interposition of a priming coat in order to provide commercial tapes having pressure-sensitive adhesives sufficiently bonded to the backing to prevent lamination of the tape upon unwinding thereof from a roll.

This invention has for one object the provision of a novel method of uniting a coating, and especially a pressure-sensitive adhesive coating, to a smooth surfaced and non-fibrous backing of the type necessitated in the fabrication of highly transparent tapes. The method of this invention eliminates the restrictions of particular combinations of adhesives and priming coats which now hamper manufacturers in the fabrication of such tapes.

One of the remarkable adjuncts of the invention is that, in its application, the chief quality sought in the final product, namely, transparency, is initially and temporarily deliberately destroyed, or at least decidedly impaired, so far as the backing is concerned, and is thereafter restored in a manner which will be more fully described. Thus, to accomplish the results of this invention, one of the initial steps is directly in opposition to the normal and expected approach. Yet by this step one is enabled to utilize, as a directly-applied-single-layer-adhesive coating, materials which heretofore were incapable of commercial use when directly applied to backings of the type herein referred to because of detrimental "picking" and delamination of the adhesive when the tape was unrolled from itself. The resulting saving in material and manufacturing cost is substantial.

Other objects of the invention are therefore the production of a simpler, cheaper transparent pressure-sensitive adhesive tape and one having a strength of adhesive-to-backing bond equal or superior to tapes having primed backings.

As backings for the tape of this invention various flexible transparent membranaceous sheet materials may be used, among which may be mentioned those comprising regenerated cellulose, benzyl cellulose, ethyl cellulose, cellulose acetate, or mixed esters of cellulose, transparent papers, such as glassine and parchment, rubber-like sheet materials, such as Pliofilm (rubber hydrochloride—Goodyear Tire and Rubber Company) and Tensolite (rubber chloride stretched under heat), synthetic resinous materials, such as polymers of vinyl acetate or of vinyl chloride or co-polymers thereof, polyamide type resins such as nylon, or protein or protein-like substances, such as casein.

With materials of this type, the invention comprises a preparation of the surface of the backing on which the adhesive is to be spread, to impart to that surface superior adhesive-receptive and adhesive-retaining properties by roughening the surface to increase its surface area and to provide at the same time, preferably, disruptions of such contour and location as to enhance the physical anchorage of the adhesive. In the case of disruptions the surface assumes a pitted, pocked or scratched appearance which, in addition to increasing the surface area, in many instances, actually exposes the interior structure or body of the backing for anchorage of the adhesive beneath any adhesive-repellent surface contaminations or molecular arrangements which may be present. Necessarily, however, such disruptions greatly impair the transparency of the backing.

Disruptions of this character may be satisfactorily accomplished by abrading the surface in a variety of manners, including the forceful impacting of finely-divided loose abrading particles against the smooth surface or the rotation of abrasive rolls or discs against the smooth surface in such manner that the abrasive grit abrades the surface along generally predetermined paths with a control of the frequency, size and contour of the disruptions for the purposes required under the particular circumstances.

Thus, one satisfactory method of abrasion includes the use of a conventional sandblasting machine which directs a blast of grit against one surface of the sheet. Either fluid pressure or a mechanical rotor may be used. Oftentimes more than one pass through such a machine is desirable, depending upon the size of the grit used and the density and speed of the impacted stream of grit, in order to insure formation of a multitude of surface disruptions closely adjacent to each other and finely distributed over the entire area to be subsequently coated. Preferably the disruptions should be sufficiently fine and sufficiently closely distributed to give the backing a definite frosted or murky appearance, with most of the individual disruptions almost microscopic and with even the largest ones only difficultly visible as individual cuts without optical aids. In many cases the disruptions should be so closely distributed that their boundaries tend to touch, thus reducing the intervening areas between the disruptions to a minimum. Such sandblasting may result in an actual removal of material, pitting or pocking the surface and exposing the internal structure of the backing for contact with the later applied adhesive. Obviously it can be expected that the pittings or pockings may have highly irregular contours—with perhaps jagged and undercut edges, sometimes caused by a plastic flow of the material—of a type which enhance the mechanical anchorage of the later applied adhesive.

It has been found that a treatment of this character on one surface of a Cellophane sheet with a distribution of the small scratches, pittings or markings across the entire area which is to be covered with adhesive, results in increasing the adhesion between the adhesive and the Cellophane over that which would occur between the same adhesive and the back untreated surface of the Cellophane sheet in an amount as much as or more than 150 per cent. A differential adhesion of this order is ample to insure that the tape may be rolled upon itself. By lessening the disruptive character of the preliminary treatment so that the pittings or pockings occur less frequently or are of less depth, the differential adhesion will of course not be as great. However, inasmuch as ability to roll and unroll is one of the prime requirements of a commercially satisfactory tape, usually a treatment will be given which secures the maximum increased adhesion consistent with individual requirements of manufacturing economy and uniformity.

As illustrative of a rotary abrading operation the use of abrading rolls or belts may be mentioned, wherein one or more abrading rolls are rotated against the backing surface, preferably in a direction opposite to the direction of advance of the backing. Where the abrading rolls are rotated on a fixed axis normal to the direction of advance of the backing, the resulting markings will take on the aspect of linear cuts or rulings running longitudinally of the backing.

It has been found that a location of the cuts so that they run in a direction other than longitudinally of the backing aids materially in procuring firm anchorage of the later-applied coating against the usually encountered laminating forces, and as a result, it has been found beneficial to reciprocate the abrading rolls along their axes during operation so that the resulting cuts appear more or less as sinusoidal curves intersecting each other at intervals.

Similar results may be secured by mounting two abrading rolls in succession on axes disposed at opposing angles to the direction of advance of the backing material. This will result in a plurality of angular cuts with a tendency for the cuts made by the second roll to intersect those made by the first roll. In fact, criss-cross linear disruptions may be formed in this manner, with all the cuts disposed at an angle or 45° or at any other desirable angle to the direction of advance. Here, too, grit size and speed of operation will control the frequency or proximity of the disruptions.

A still further contour of cut may be accomplished by utilizing abrasion discs instead of rolls or belts, with the disc rotating about an axis substantially perpendicular to the plane of the advancing backing material. Unless, however, a substantial number of small discs is provided it is difficult to secure a uniform marking as the increasing linear speed of a disc progressively outwardly from its center will tend to cut those portions of the surface remote from the disc center more than those portions adjacent the center of the disc. However, this type of operation does present a highly satisfactory marking for the purposes of this invention because the cuts are curvilinear and by the use of more than one disc may be made intersecting.

As in the case of sandblasting, the location and contour of the cuts made by these other abrading operations may be varied depending upon the size of the grit used, the number of rolls or discs, and the relative speeds of the sheet material and abrading rolls or discs.

I have found that the transparency of the backing may for practical purposes be completely restored by application to the roughened surface, of a coating of transparent material so selected that, when completely covering and filling in the disruptions in the backing material surface, diffusion of transmitted and reflected light by the roughened surface will be substantially eliminated. The degree of restoration of transparency depends, among other things, upon the relation of the index of refraction of the selected coating material to the index of refraction of the material of which the disrupted surface is composed, and therefore, for optimum results in securing restoration of transparency, attention must be given to this particular relation, although where transparency is not essential, this relation is unimportant and therefore may be disregarded.

The effect of this relation will now be discussed. For many practical purposes, transparency is sufficiently restored to the prepared transparent backing surface merely by the application thereto of any transparent coating. By way of explanation, the amount of diffusion of transmitted and reflected light depends upon the difference between the indices of refraction of the material composing the disrupted backing surface and the substance in contact with it, diffusion decreasing as the difference between these tow indices becomes smaller. For example, the index of refraction of a Cellophane film was found to be 1.52, while the index of refraction of air is given as 1.00029, from which it can be said that the uncoated roughened Cellophane surface diffuses light as the result of a contacting substance having an index of refraction 34.2% less than that of the Cellophane. Experiments show that application to this Cellophane of any transparent liquid or solid increases the transparency, because in general the indices of refraction of liquids and solids are appreciably greater than that of gases. Thus the application of water, with index of refraction of 1.33, or 12.5% less than that of the Cellophane, increases the transparency to the extent that when the Cellophane is placed upon a printed paper surface with the moistened surface on top, the printing is plainly visible, although on holding the Cellophane between the eye and a source of light, the disruptions in the surface are still visible. For many purposes this degree of transparency meets the requirements of a transparent tape.

However, transparency of even greater degree is desirable in some tapes, and it has been found that when the indices of refraction of the transparent coating material and the transparent material composing the disrupted backing surface are related within certain narrow limits, the disruptions become substantially invisible to the naked eye even when the backing is placed between the eye and a source of daylight. Experiments show that when the index of refraction of the coated film differs from that of the material composing the disrupted backing surface in an amount less than approximately 2%, such superior transparency is achieved. As the percentage difference is increased, the disruptions gradually appear with the increasing diffusion. For practical manufacturing purposes, we have found that adhesive tapes having the degree of transparency described in this paragraph can be made when the coated film differs as much as 4% from that of the material composing the disrupted surface, because other factors, such as the unavoidable scratching of the uncoated backing surface, and the slight unevennesses produced on the adhesive surface when it is unrolled, make the difference between the 2% and 4% limits practically unnoticeable.

When attention to this relation is found desirable, the index of refraction of a transparent coating film can be made to approach the index of refraction of the material of the prepared backing surface through a selection of the constituent materials of the coating with regard both to their indices of refraction and to their proportions, but the simplest method is to choose as components for the coating, materials, each of which has an index of refraction within the required limits with relation to the index of refraction of the backing surface, as is illustrated by the following example of a suitable pressure-sensitive adhesive for a Cellophane having an index of refraction of 1.52, in which diffusion is to be completely eliminated as hereinbefore described.

Rubber (highly plasticized pale crepe, index of refraction 1.52)_____parts by weight__ 100
Stabilite ester (hydrogenated glycerol abietate, index of refraction 1.52)___parts__ 33

However, oftentimes the most desirable components of the coating material can not be chosen from those within the required limits of index of refraction. Some components may be considerably above, and others considerably below what is required. Also, the indices of refraction of the various types of desirable transparent films, pressure-sensitive or non-pressure-sensitive, vary considerably, for example from 1.46–1.53 for vinylite polymers, to 1.5–1.7 for polystyrene polymers, so that the same coating may not give equally satisfactory results with different backing materials. The coating must therefore be chosen with relation to the particular backing material contemplated.

Formulation is facilitated by selecting the component materials and their proportions with an eye to their individual indices of refraction, so that the resulting composition will have an index of refraction within the limits required. The effect of a component substance has been found to be roughly proportional to its index of refraction and its solid volume, and by calculations based on this relationship, the formulation of coating compositions can be greatly facilitated without preliminary experimental mixtures and tests. Furthermore, the choice of various types of backing materials and coating compositions is thereby extended beyond what might otherwise be considered as possible.

As is understood, application of the adhesive coating is, in the usual case, made over the entire roughened area so that the coating is co-extensive therewith. Such application may be made according to the particular materials used by either the hot-melt, calender, or solvent-spread method.

Where regenerated cellulose is used as the backing, we prefer a type which has not been moisture-proofed on the interface surface, though the opposite surface may well include a moisture-proof coating. In fact, the type of preparation herein disclosed is applicable as hereinbefore indicated, to the fabrication of sheet material having coatings which are not pressure-sensitive and the novel preparatory step may be provided on both surfaces of the sheet with subsequent application of the same kind or different kinds of coatings on the opposite surfaces. Thus a plain regenerated cellulose sheet may be treated on both sides in accordance with this invention, and subsequently a non-pressure-sensitive moisture-proof or other coating may be applied to one side and a pressure-sensitive adhesive coating may be applied to the opposite side. The additional adhesion of the back surface coating afforded by the preliminary treatment of the back surface is effective in preventing lamination along this plane during unwinding of a roll of the tape.

In some instances colored backings may be desirable and the technique herein described has equally effective results when colored or opaque smooth, non-fibrous sheet backings are utilized. On other occasions, the increased bond provided by the preparatory surface treatment of the backing becomes desirable in tapes having smooth surfaced, semi-transparent or opaque fibrous backings, for example, Holland cloth or backings of the type described in copending applications of Reed and Zeigler, Serial Nos. 350,064 and 351,242, or even having metallic foil backings, such as aluminum, tin, zinc, or copper foils. In each instance, the disruption of the contemplated interface surface can provide an increased bond, either because of the increased area, or because of the removal of any surface contaminations tending to reduce adhesion, or both, and will permit the use of adhesives which heretofore have been incapable of use on the particular backings without interposition of priming coats.

While the results of the preparatory operation so far disclosed have been termed disruptions, a somewhat different type of preparation may have results sufficiently effective for some purposes and is inherently desirable from an economy standpoint where both sides of the backing are to undergo the preliminary treatment. Thus, instead of completely disrupting the surface, both surface areas may be substantially roughened and take the form of any of the previously described abrasions insofar as contour and location is concerned, by running the backing in its preparatory treatment under pressure against a roll of a hard material such as steel, which roll has previously been subjected to any one of the previously described treatments. Thus, a previously sandblasted steel roll will roughen a sheet of regenerated cellulose and impart to one surface a contour complemental to the contour of the steel roll, for instance, closely adjacent minute pockings or pittings. I have found, however, that the markings may not all be actual disruptions of the surface, especially after continued use of the same abrading roll. The beneficial adhesive retaining properties of a disrupted surface are therefore not as apparent in this type of backing and, accordingly, the resulting tape with its subsequently applied adhesive has not seemed to possess a tenacity against lamination comparable to a tape prepared in accordance with the preferred surface-disrupting methods of this invention.

Likewise with some materials, interface surfaces such as those previously described may be prepared as a step in the manufacture of the backing either with or without the preliminary formation of a smooth surface.

This invention thus provides a surface-disruption treatment of backings which, in the case of transparent backings, initially impairs transparency, but which supplies a superior adhesion of a later applied coating to the backing without detracting, as it turns out, from the original transparency because of the substantially complete restoration of transparency coincidental to application of the transparent adhesive. The invention also provides for the preparation of flexible backings which have interface surfaces of a character which provide superior adhesion of directly-applied single-layer pressure-sensitive and other adhesive coatings while retaining transparency in the completed tape.

I claim:

1. A transparent pressure-sensitive adhesive tape comprising a flexible non-fibrous film backing having one side thereof roughened to present a surface having distributed substantially completely thereover a multiplicity of minute, closely adjacent disruptions increasing the surface area of said side, but collectively forming a surface which diffuses reflected light, and a coating of a transparent pressure-sensitive adhesive affixed directly to said surface and completely covering said disruptions, whereby said adhesive is firmly bonded to said backing and diffusion of transmitted and reflected light by said surface is substantially eliminated to render said combined adhesive and backing transparent.

2. A transparent pressure-sensitive adhesive tape comprising a flexible non-fibrous film backing having one side thereof roughened to present a surface having distributed substantially completely thereover a multiplicity of fine closely adjacent linear disruptions, said disruptions increasing the surface area of said side, but collectively forming a surface which diffuses reflected light, and a coating of a transparent pressure-sensitive adhesive material affixed directly to said surface and completely covering said disruptions, whereby said adhesive is firmly bonded to said backing and diffusion of transmitted and reflected light by said surface is substantially eliminated to render said combined adhesive and backing transparent.

3. A transparent flexible sheet material comprising a flexible smooth-surfaced sheet backing having one side thereof roughened to present a surface having finely distributed substantially completely thereover a multiplicity of minute disruptions increasing the surface area of said side, but collectively forming a surface which diffuses reflected light and renders the backing frosted and murky in appearance, and a coating of a transparent material adhesively affixed directly to said surface and completely covering said disruptions, whereby said coating is firmly bonded to said backing and diffusion of transmitted and reflected light by said surface is substantially eliminated to render said combined coating and backing transparent.

4. A transparent pressure-sensitive adhesive tape comprising a flexible non-fibrous film backing having one side thereof roughened to present an unevenness increasing the surface area of said side, but forming a surface of a type which diffuses reflected light, and a coating of a transparent pressure-sensitive adhesive material affixed directly to and completely covering said surface, whereby said coating is firmly bonded to said backing and diffusion of transmitted and reflected light by said surface is substantially eliminated to render said combined coating and backing transparent.

5. A transparent adhesive sheet material comprising a flexible transparent sheet backing having one side thereof roughened to present an unevenness increasing the surface area of said side, but forming a surface of a type which diffuses reflected light, and a coating of a transparent adhesive material having an index of refraction substantially the same as that of said backing affixed directly to and completely covering said surface, whereby said coating is firmly bonded to said backing, diffusion of reflected light by said surface is substantially eliminated, and said combined coating and backing is rendered transparent.

6. A transparent pressure-sensitive adhesive tape comprising a flexible non-fibrous film backing having one side thereof roughened to present a surface having distributed substantially completely thereover a multiplicity of minute, closely adjacent disruptions increasing the surface area of said side, but collectively forming a surface which diffuses reflected light, and a coating of a transparent pressure-sensitive adhesive affixed directly to said surface and completely covering said disruptions, whereby said adhesive is firmly bonded to said backing, said coated adhesive having an index of refraction substantially the same as the index of refraction of the material of which the roughened surface is composed thereby substantially eliminating diffusion of transmitted and reflected light by said surface to prevent any detrimental impairment of the transparency of the combined adhesive and backing by reason of the presence of said roughened surface.

7. A transparent pressure-sensitive adhesive sheet material comprising a flexible transparent sheet backing having both sides thereof roughened to present an unevenness increasing the surface area of said sides but forming surfaces of a type which diffuse reflected light and render the backing frosted and murky in appearance, and coatings of transparent adhesive material firmly united with both surfaces of said sheet backing, at least one of said coatings comprising a transparent pressure-sensitive adhesive material.

8. The method of fabricating a transparent adhesive tape which comprises frosting a surface of a sheet of regenerated cellulose, thereby lessening the transparency of said sheet but increasing its surface area, and then applying directly to said frosted surface an overlying transparent pressure-sensitive adhesive coating, thereby eliminating diffusion of reflected light by said surface and rendering the adhesive coated tape more transparent than its backing prior to application of said coating.

9. The method of fabricating a transparent adhesive tape which comprises roughening a surface of a sheet of regenerated cellulose, thereby lessening the transparency of said sheet but increasing the surface area of the roughened surface, and then applying a transparent pressure-sensitive adhesive coating to the roughened surface, thereby rendering the adhesive coated tape more transparent than its backing prior to application of said coating.

10. A transparent pressure-sensitive adhesive tape comprising a sheet of regenerated cellulose having a surface thereof roughened, and a coating of transparent pressure-sensitive adhesive affixed directly to said roughened surface, whereby said coating is firmly bonded to said backing sheet.

11. A transparent pressure-sensitive adhesive tape comprising a backing sheet of regenerated cellulose having one side thereof roughened to present a surface having finely distributed substantially completely thereover a multiplicity of intersecting criss-cross linear disruptions increasing the surface area of said side and exposing the internal structure of said backing sheet, but collectively forming a surface which diffuses reflected light and renders the backing frosted and murky in appearance, and a coating of a transparent pressure-sensitive adhesive material affixed directly to said side, whereby said adhesive is firmly bonded to said backing and diffusion of transmitted and reflected light by said surface is substantially eliminated to render said combined coating and backing more transparent than the roughened regenerated cellulose sheet prior to application of said coating.

MILTON H. KEMP.